(12) United States Patent
Wang (10) Patent No.: US 12,485,303 B2
(45) Date of Patent: Dec. 2, 2025

(54) ENDOTHERMIC AND FIRE SUPPRESSIVE MATERIAL AND LITHIUM BATTERY MODULE

(71) Applicants: Maxim Nature Green Energy Solutions, Ltd., Taoyuan (TW); LiWatt X Incorporation, Taoyuan City (TW)

(72) Inventor: Xiaojing Wang, Taoyuan (TW)

(73) Assignees: Maxim Nature Green Energy Solutions, Ltd., Taoyuan (TW); LiWatt X Incorporation, Taoyuan (TW)

( * ) Notice: Subject to any disclaimer, the term of this patent is extended or adjusted under 35 U.S.C. 154(b) by 287 days.

(21) Appl. No.: 18/337,456

(22) Filed: Jun. 20, 2023

(65) Prior Publication Data

US 2023/0414982 A1    Dec. 28, 2023

Related U.S. Application Data

(60) Provisional application No. 63/354,695, filed on Jun. 23, 2022.

(51) Int. Cl.
*A62C 3/16* (2006.01)
*A62D 1/06* (2006.01)
(Continued)

(52) U.S. Cl.
CPC .......... *A62C 3/16* (2013.01); *A62D 1/06* (2013.01); *H01M 10/0525* (2013.01);
(Continued)

(58) Field of Classification Search
CPC ....... A62C 3/16; A62D 1/06; H01M 10/0525; H01M 10/658; H01M 50/24; H01M 2200/10
See application file for complete search history.

(56) References Cited

U.S. PATENT DOCUMENTS

| 2011/0159341 A1* | 6/2011 | Iwamoto | H01M 50/24 |
| | | | 429/120 |
| 2017/0214018 A1* | 7/2017 | Sun | A62D 1/06 |
(Continued)

FOREIGN PATENT DOCUMENTS

| CN | 106159121 | 11/2016 | |
| CN | 106159121 A * | 11/2016 | H01M 50/116 |
(Continued)

OTHER PUBLICATIONS

Chung-Hwei Su et al., "The Assessment of Fire Suppression Capability for the Ammonium Dihydrogen Phosphate Dry Powder of Commercial Fire Extinguishers", Procedia Engineering, Nov. 20, 2014, pp. 485-490, vol. 84.
(Continued)

*Primary Examiner* — Alex M Valvis
(74) *Attorney, Agent, or Firm* — JCIPRNET (57) ABSTRACT

A lithium battery module including a housing, a cover, at least one lithium battery cell and a fire retardant material is provided. The cover covers the housing. The housing and the cover form an accommodating space. The lithium battery cell is disposed in the accommodating space. The fire retardant material is filled in the accommodating space.

6 Claims, 10 Drawing Sheets

(51) Int. Cl.
*H01M 10/0525* (2010.01)
*H01M 10/658* (2014.01)
*H01M 50/24* (2021.01)

(52) U.S. Cl.
CPC ......... *H01M 10/658* (2015.04); *H01M 50/24* (2021.01); *H01M 2200/10* (2013.01)

(56) References Cited

U.S. PATENT DOCUMENTS

| | | |
|---|---|---|
| 2018/0331386 A1 | 11/2018 | Koh et al. |
| 2021/0119260 A1 | 4/2021 | Liang et al. |
| 2022/0021046 A1 | 1/2022 | Shi et al. |

FOREIGN PATENT DOCUMENTS

| | | | | |
|---|---|---|---|---|
| CN | 106997953 | | 8/2017 | |
| CN | 110311138 | | 10/2019 | |
| CN | 110311138 A | * | 10/2019 | ........ H01M 10/0567 |
| CN | 209822728 | | 12/2019 | |
| CN | 111263992 A | * | 6/2020 | ............ H01M 4/139 |
| CN | 113422133 | | 9/2021 | |
| CN | 113422133 A | * | 9/2021 | ........ H01M 50/3425 |
| CN | 114350326 | | 4/2022 | |
| CN | 114597588 A | * | 6/2022 | ........ H01M 10/0525 |
| EP | 4181288 A1 | * | 5/2023 | ............ H01M 50/24 |
| JP | H0919990 | | 1/1997 | |
| JP | 2002105336 | | 4/2002 | |
| JP | 2009099322 | | 5/2009 | |
| TW | M496240 | | 2/2015 | |
| TW | 202106757 | | 2/2021 | |
| TW | 202205724 | | 2/2022 | |
| WO | WO-03022948 A2 | * | 3/2003 | ............ C09K 21/12 |

OTHER PUBLICATIONS

"Office Action of Taiwan Counterpart Application", issued on Nov. 27, 2023, p. 1-p. 6.
"Search Report of Europe Counterpart Application", issued on Dec. 19, 2023, p. 1-p. 7.
"Notice of allowance of Japan Counterpart Application", issued on Aug. 13, 2024, p. 1-p. 2.
"Office Action of Japan Counterpart Application", issued on May 7, 2024, p. 1-p. 3.
Qunli Zhao, "Railway Fire Fighting Tutorial", China People's Public Security University Press, Mar. 31, 2016, with English translation thereof, pp. 1-5.
"Office Action of China Counterpart Application", issued on Mar. 14, 2025, p. 1-p. 12.
Cheng et al., "Practical Forest Fire Prevention Technology", Forestry Science Press, Jun. 30, 1982, p. 242, with English translation thereof.
"Office Action of China Counterpart Application", issued on Aug. 4, 2025, p. 1-p. 12.

* cited by examiner

ENDOTHERMIC AND FIRE SUPPRESSIVE MATERIAL AND LITHIUM BATTERY MODULE

CROSS-REFERENCE TO RELATED APPLICATION

This application claims the priority benefit of U.S. provisional application Ser. No. 63/354,695, filed on Jun. 23, 2022. The entirety of the above-mentioned patent application is hereby incorporated by reference herein and made a part of this specification.

BACKGROUND

Technical Field

The disclosure relates to an endothermic and fire suppressive material and a battery module, particularly to an endothermic and fire suppressive material and a lithium battery module.

Description of Related Art

The application of a lithium battery module or a lithium battery cell are more and more widely. Moreover, based on an applicability of a product, the capacity of a lithium battery module or a lithium battery cell is increasing.

If a lithium battery module or a lithium battery cell is used improperly, or if an external protection circuit (e.g., a battery management system (BMS)) fails, or when external damage causes changes in the internal structure of a lithium battery module or a lithium battery cell, it is easy to cause the internal short circuit phenomenon of the lithium battery module or the lithium battery cell. Therefore, there is a high probability that a single or a group of lithium batteries will burn and explode and spread to other lithium batteries, causing a large-scale combustion and explosion hazard, endangering the safety of life and property.

Furthermore, a lithium battery module or a lithium battery cell may have a corresponding electric potential energy. Once a large amount of energy is released in an instant, it is difficult for general fire suppressive equipment to extinguish and/or suppress the fire caused by it in time, and it also needs to consume a large amount of water resources to cool down and/or endothermic. Therefore, if people's lives and properties are endangered, it will cause uncontrollable consequences and losses.

Based on the above, the safety of a lithium battery module or a lithium battery cell is very important.

SUMMARY

According to an embodiment of the disclosure, an endothermic and fire suppressive material includes barbituric acid, barbituric acid derivative, or a combination thereof.

According to an embodiment of the disclosure, a lithium battery module includes a housing, a cover, at least one lithium battery cell and an endothermic and fire suppressive material. The cover covers the housing. The housing and the cover form an accommodating space. The lithium battery cell is disposed in the accommodating space. The endothermic and fire suppressive material is filled in the accommodating space.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the disclosure, for an object or a material, "fireproof", "fire-extinguishing" or "fire-suppressive" or "fire retardant" used herein mean the object or the material (including but not limited to: film, layer, block and other structures) may pass the flame retardancy criteria of the standard test method. For example, taking the UL94 plastic flammability standard (Test for Flammability of Plastic Materials for Parts in Devices and appliances) issued by Underwriters Laboratories Inc (UL) as an example, the degree is at least the HB level; preferably V1 level; more preferably 5VA level.

[A Partial Manufacturing Method of a Lithium Battery Module]

Figure 1A:
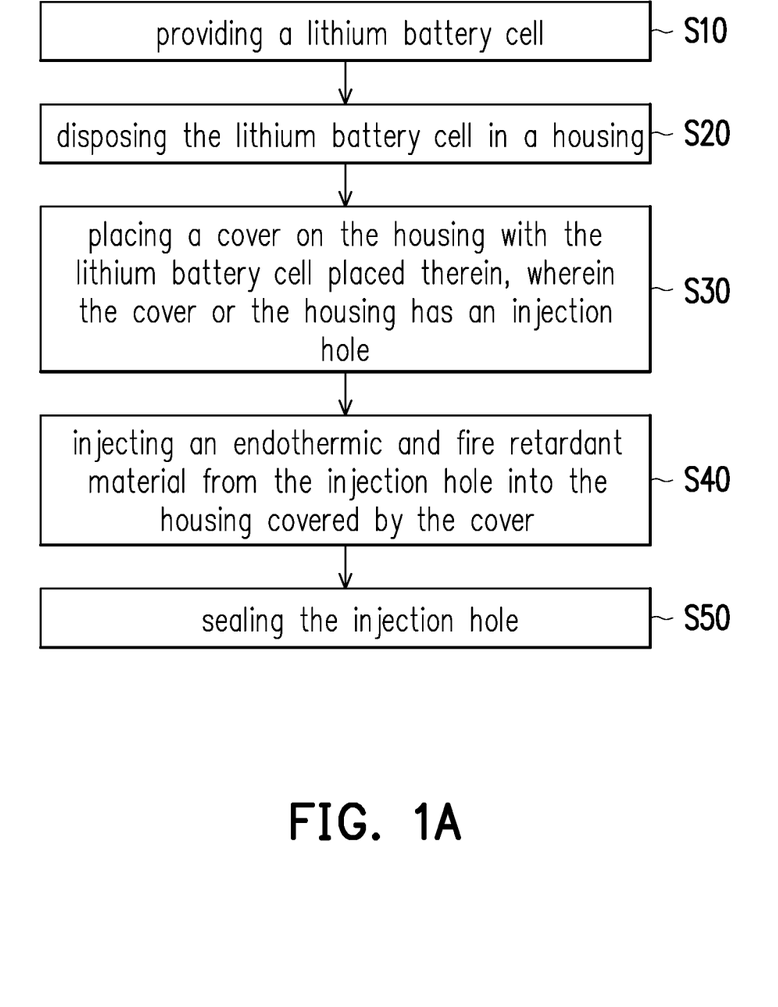
FIG. 1A is a partial flowchart of a partial manufacturing method of a lithium battery module according to an embodiment of the disclosure.

FIG. 1A is a partial flowchart of a partial manufacturing method of a lithium battery module according to an embodiment of the disclosure.

Figure 1B:
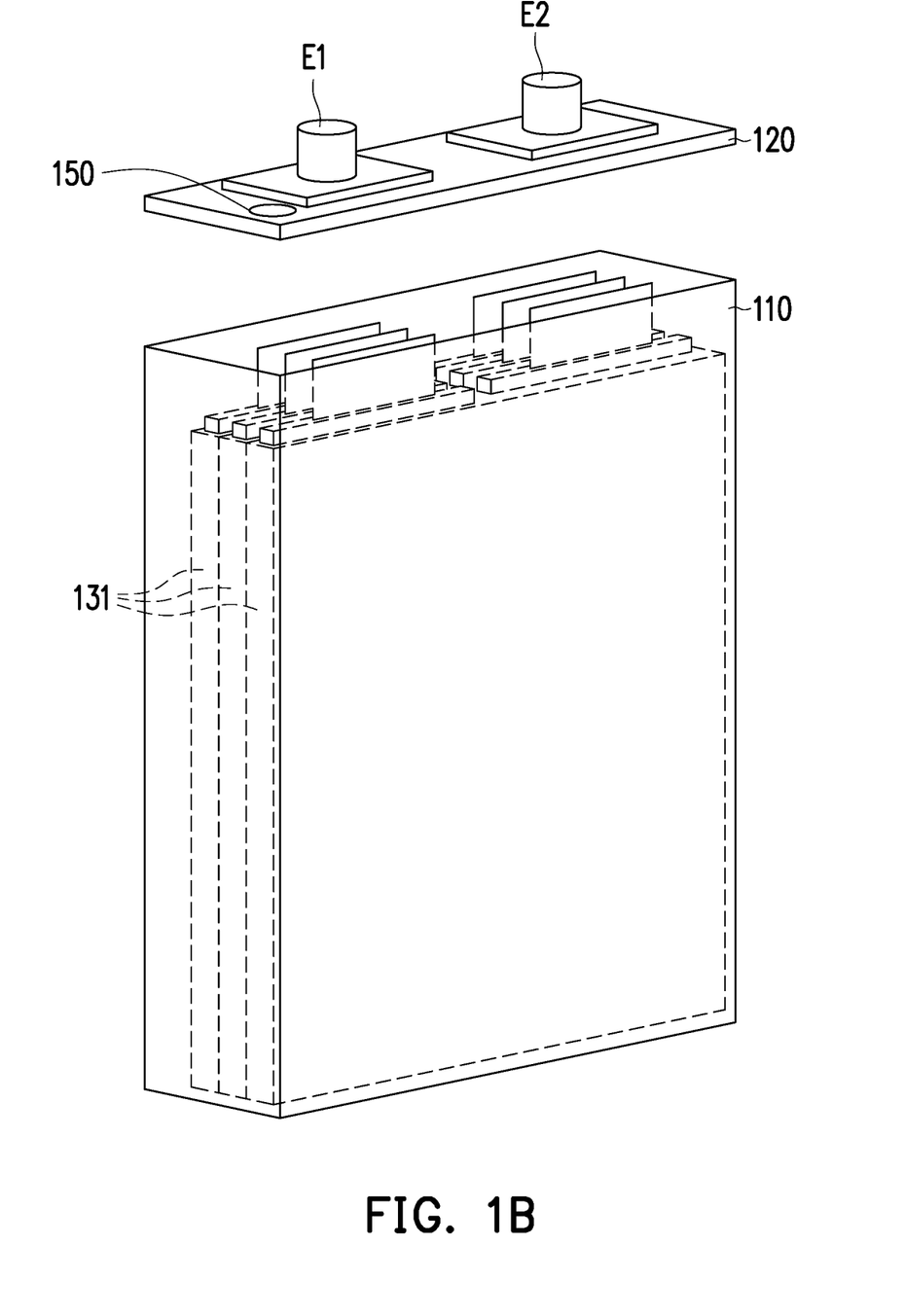
FIG. 1B to FIG. 1C are partial perspective views of a partial manufacturing method of a lithium battery module according to a first embodiment of the disclosure.
Figure 1C:
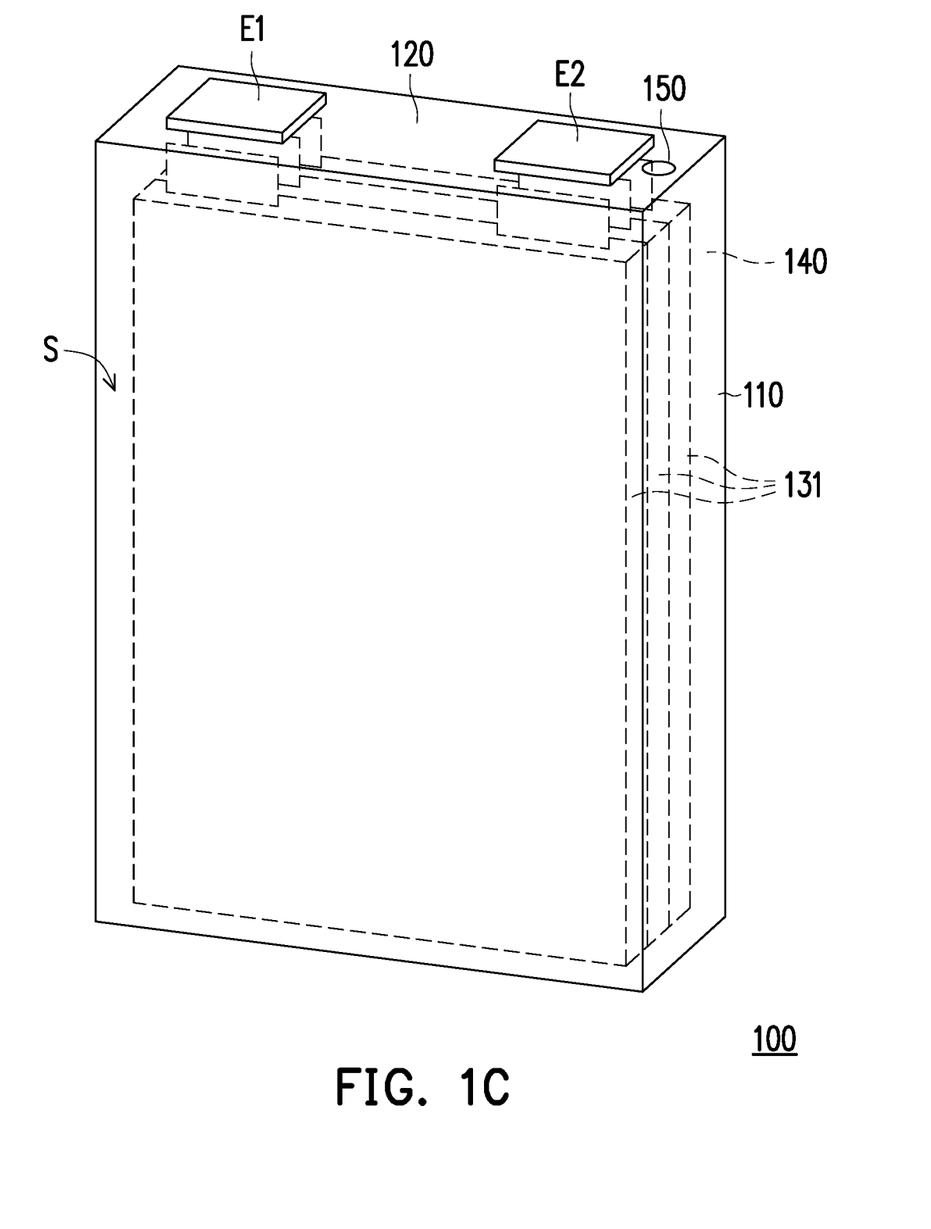

A partial manufacturing method of a lithium battery module may be described as follows. In addition, for the convenience of description, in the following description of the manufacturing method of the lithium battery module, the corresponding drawing symbols may be understood by referring to FIG. 1B to FIG. 1C exemplarily. It should be noted that the partial manufacturing method of the lithium battery module is not limited to those shown in FIG. 1B to FIG. 1C. Similarly, for the lithium battery module as shown in FIG. 1C, the flowchart as shown in FIG. 1A may be an exemplary partial process.

Referring to FIG. 1A, step S10: at least one lithium battery cell (e.g., a lithium battery cell 131 described later, a lithium battery cell 432 described later, or a lithium battery cell similar thereof; but not limited to) is provided. The disclosure is not limited to the form of the lithium battery cell, as long as it meets a standard of a general lithium battery cell. For example, a lithium battery cell may include a square tank type battery cell, a prismatic type battery cell a pouch type battery cell, or a cylindrical type battery cell;

for example, a 126090-type battery cell, an 18650-type battery cell, or similar. In an embodiment, there may be a plurality of lithium battery cells. The plurality of lithium battery cells may be connected in series or in parallel. Whether it is a single lithium battery cell, a plurality of lithium battery cells in series, or a plurality of lithium battery cells, all must comply with a corresponding lithium battery cell standard, such as but not limited to: IEC 61960 standard, IEC62619 standard, VDE-AR-E 2510-50 standard, CNS 15391-2 standard, UL 1642 standard.

Referring to FIG. 1A, step S20: the lithium battery cell is disposed in a housing (such as a housing 110 described later, a housing 310 described later, a housing 410 described later, a housing 510 described later, a housing described later, or a housing similar thereof; but not limited to). The disclosure is not limited to the form of the housing, as long as it is suitable for a corresponding object (e.g., the lithium battery cell) to be placed therein; and/or, it is suitable for being injected a corresponding material (e.g., an endothermic and fire suppressive material mentioned later).

In an embodiment, the housing may meet a general fire protection standard. In an embodiment, a material of the housing may include metal (e.g., an aluminum galvanized shell), a metal alloy (e.g., an aluminum-silicon alloy coating housing) or a polymer (e.g., Bakelite).

In an embodiment, the housing may have an injection hole (e.g., an injection hole 150 described later, but not limited).

In an embodiment, there may be an electrode contact (e.g., a positive contact and/or a negative contacts) on the housing. The electrode contact on the aforementioned housing may be electrically connected to a corresponding electrode (e.g., a positive electrode or a negative electrode) of the lithium battery cell by an appropriate conductor (e.g., a wire connection and/or a circuit board connection).

Referring to FIG. 1A, step S30: a cover (e.g., a cover 120 described later, a cover 320 described later, a cover 420 described later, a cover 520 described later, a cover 620 described later, or a lithium battery cell similar thereof; but not limited to) is placed on the housing with the lithium battery cell placed therein. The disclosure is not limited to the form of the cover, as long as it is suitable for covering the housing.

In an embodiment, the cover may meet a general fireproof standard. In an embodiment, the material of the cover may be the same or similar to the material of the housing.

In an embodiment, the cover may have an injection hole (e.g., an injection hole 150 described later, but not limited).

In an embodiment, there may be an electrode contact (e.g., a positive contact and/or a negative contacts) on the cover. The electrode contact on the aforementioned cover may be electrically connected to a corresponding electrode (e.g., a positive electrode or a negative electrode) of the lithium battery cell by an appropriate conductor (e.g., a wire connection and/or a circuit board connection).

Referring to FIG. 1A, step S40: an endothermic and fire suppressive material (e.g., an endothermic and fire suppressive material 140, or an endothermic and fire suppressive material similar thereof; but not limited to) is injected from the injection hole into the housing with the cover covering it.

In the embodiment, the endothermic and fire suppressive material may include insulating and non-conductive liquid, colloid, or powdered solid.

In an embodiment, the endothermic and fire suppressive material may include a suitable endothermic fluid, a suitable flame retardant and/or a suitable flame retardant.

In an embodiment, the endothermic and fire suppressive material may include an ether compound. The aforementioned ether compound may include, but are not limited to: ethyl perfluorobutyl ether (CAS: 163702-05-4), ethyl nonafluoroisobutyl ether (CAS: 163702-06-5), or a combination there above.

In an embodiment, the endothermic and fire suppressive material may include an organophosphorus compound. The aforementioned organophosphorus compound may include, but are not limited to: 2-carboxyethyl(phenyl) phosphinicacid (CAS: 14657-64-8), 6-oxido-6H-dibenz[c,e][1,2]oxaphosphorin-6-yl)methyl] butanedioic acid (CAS: 63562-33-4), [(6-oxido-6H-dibenz[c,e][1,2]oxaphosphorin-6-yl)methyl]butanedioic acid bis(2-hydroxyethyl) ester (CAS: 63562-34-5), 10-benzylmethyl-9-oxa-10-phosphaphenanthrene-10-oxide (CAS: 113504-81-7), 6,6'-(1-phenylethane-1,2-diyl)bis(6H-dibenzo[c,e][1,2]oxaphosphinine) 6,6'-dioxide (CAS: 1631149-46-6), or a combination there above.

In an embodiment, the endothermic and fire suppressive material may include an organobromine compound. The aforementioned organobromine compound may include but are not limited to: 2,3-dibromo-2-propen-1-ol, dibromomethane, 1,2-dibromoethane, 1,2-dibromoethylene, 1,4-dibromobutane, 1,5-dibromopentane, or a combination thereabove.

In an embodiment, the endothermic and fire suppressive material may include barbituric acid or barbituric acid derivative (e.g., barbiturates; or, one of the hydrogen atoms bonded to the carbon atom of barbituric acid is replaced by methyl, ethyl or isotopes; or a salt thereof). In the process of combustion, the barbituric acid or the barbituric acid derivative (may be referred as: the barbituric acid/derivative thereof) may be used as a free radical scavenger (FRS), which may reduce the concentration or quantity of free radicals in the process of combustion. As such, the combustion may be slowed down or stopped. In an embodiment, the barbituric acid or the barbituric acid derivative may produce water and carbon dioxide after being heated and/or burned, in which water may reduce the ambient temperature (which may be regarded as cooling or endothermic), and carbon dioxide may reduce combustion (which may be regarded as fire extinguishing, or fire-suppressive, or fire retardant). As such, the barbituric acid or the barbituric acid derivative may be suitable as an endothermic and fire suppressive material.

In an embodiment, even if an unexpected short circuit occurs inside the lithium battery module (including but not limited to: damage or short circuit of the lithium battery cell, damage or short circuit of the internal circuit) and a large amount of electric potential energy is converted into heat energy, if the barbituric acid/derivative thereof are used as an endothermic and fire suppressive material, it may reduce the maximum temperature after the lithium battery module is short-circuited and heated up. In an embodiment, if the barbituric acid/derivative thereof are used as an endothermic and fire suppressive material, the maximum temperature after the lithium battery module is short-circuited and heated up may be lower than the minimum temperature of thermal decomposition or thermal degradation of the solid electrolyte interface (SEI) used in a general lithium battery cell. The solid electrolyte interface (SEI) may be a layer (e.g., a passivation layer). The minimum temperature of thermal decomposition or thermal degradation of the solid electrolyte interface (SEI) used in a general lithium battery cell is about 100° C. That is to say, compared with not using the barbituric acid/derivative thereof, the barbituric acid/derivative thereof may at least reduce the maximum temperature after the lithium battery module is short-circuited and heated up, and at least may be regarded as an endothermic material.

In an embodiment, based on the total weight of the endothermic and fire suppressive material, the weight of the barbituric acid/derivative thereof accounts for at least 1% by weight of the whole endothermic and fire suppressive material. That is, the barbituric acid, the barbituric acid derivative, or a combination thereof account for at least 1 wt % of the endothermic and fire suppressive material.

In an embodiment, the endothermic and fire suppressive material may include ammonium dihydrogen phosphate (ADP). For a combustion process, ammonium dihydrogen phosphate may absorb heat to decompose phosphoric acid and ammonia, and may continue to react in multiple steps to generate phosphorus pentoxide. Each of the aforementioned steps is an endothermic reaction, and water vapor may be generated, which may exert a cooling or endothermic effect.

In an embodiment, the endothermic and fire suppressive material may include ammonium dihydrogen phosphate and the barbituric acid/derivative thereof. In an embodiment, the weight ratio of the barbituric acid/derivative thereof to the ammonium dihydrogen phosphate may be from about 99:1 to about 1:99. In an embodiment, the weight ratio of the barbituric acid/derivative thereof to the ammonium dihydrogen phosphate may be about 4:1.

In an embodiment, the barbituric acid, the barbituric acid derivative, the ammonium dihydrogen phosphate, or a combination there above may be referred as a powder endothermic and fire suppressive material.

In an embodiment, the endothermic and fire suppressive material may include triethyl phosphate (TEP). The boiling point of triethyl phosphate may be about 215° C., and the flash point of triethyl phosphate may be about 115° C. Triethyl phosphate may be miscible with water. In an embodiment, the barbituric acid/derivative thereof may be prepared in combination with triethyl phosphate and ammonium dihydrogen phosphate, and may be used as a liquid endothermic and fire suppressive material. The above-mentioned liquid endothermic and fire suppressive material may not be ignited or produce any burning phenomenon when sprayed with a spray gun, and has the effect of endothermic. In addition, a solvent used in the aforementioned liquid endothermic and fire suppressive material may further include fluorinated solvents, brominated solvents, and dimethyl sulfoxide (DMSO), and may further exclude water.

In an embodiment, a liquid endothermic and fire suppressive material may include triethyl phosphate, water, the barbituric acid/derivative thereof, ammonium dihydrogen phosphate, wherein: the weight ratio of the barbituric acid/ derivative thereof to the triethyl phosphate may be about 99:1 to about 1:99; or, the weight ratio of the barbituric acid/derivative thereof to the ammonium dihydrogen phosphate may be about 99:1 to about 1:99. Within the aforementioned range of weight ratios, the ratio of each component may be adjusted according to the amount of heat released by the battery and/or the corresponding safety factor. In an embodiment, the weight ratio of triethyl phosphate, water, the barbituric acid/derivative thereof, ammonium dihydrogen phosphate may be about 1:4:4:1.

In an embodiment, the liquid endothermic and fire suppressive material may further include a dispersant. The dispersant may improve the dispersibility of the components in the liquid endothermic and fire suppressive material, so as to have a better heat absorption effect, cooling and/or endothermic effect. In an embodiment, the dispersant may include an acrylic polymer containing ammonium salt. In an embodiment, the dispersant may include a dispersant manufactured by Taiwan Hopax Chemicals Mfg. Co., Ltd under the tradename CA-A48.

In an embodiment, the above-mentioned liquid endothermic and fire suppressive material may be emulsified after adding a dispersant, and further increase the content of the barbituric acid/derivative thereof, and then add Boehmite and a composite material which may be formed by bonding the polyurethane (PU) foaming material and an inorganic material. In this way, the formed colloidal or emulsified endothermic and fire suppressive material may have better heat absorption, heat conduction, endothermic and fire suppressive and/or flame-resistant performance.

In an embodiment, the endothermic and fire suppressive material may include triethyl phosphate, dispersant, non-flammable solvent (e.g., water, fluorinated solvent, brominated solvent or dimethyl sulfone), the barbituric acid/ derivative thereof, ammonium dihydrogen phosphate, and N-dodecyl-N,N-dimethyl-3-ammonio-1-propanesulfonate (CAS No. 14933-08-5). The N-dodecyl-N,N-dimethyl-3-ammonio-1-propanesulfonate may be included in a zwitterionic surfactant and further be manufactured by Taiwan Hopax Chemicals Mfg. Co., Ltd under the tradename SB-10.

In an embodiment, the colloidal or emulsified endothermic and fire suppressive material may include triethyl phosphate, dispersant, non-flammable solvents, the barbituric acid/derivative thereof, ammonium dihydrogen phosphate, and N-Dodecyl-N,N-dimethyl-3-ammonio-1-propanesulfonate, wherein: the weight ratio of the barbituric acid/ derivative thereof to the triethyl phosphate may be about 99:1 to about 1:99; or, the weight ratio of the barbituric acid/derivative thereof to the ammonium dihydrogen phosphate may be about 99:1 to about 1:99. Within the aforementioned range of weight ratios, the ratio of each component may be adjusted according to the amount of heat released by the battery and/or the corresponding safety factor. In an embodiment, the weight ratio of the triethyl phosphate, the dispersant, the non-flammable solvent, the barbituric acid/derivative thereof, and the ammonium dihydrogen phosphate may be about 2:0.3:1.5:5.5:0.7.

In an embodiment, the colloidal or emulsified endothermic and fire suppressive material may include triethyl phosphate, dispersant, non-flammable solvent, the barbituric acid/derivative thereof, ammonium dihydrogen phosphate, N-Dodecyl-N,N-dimethyl-3-ammonio-1-propanesulfonate, a composite material which may be formed by bonding the polyurethane (PU) foaming material and an inorganic material, and Boehmite, wherein: the weight ratio of the barbituric acid/derivative thereof to the triethyl phosphate may be about 99:1 to about 1:99; or, the weight ratio of the barbituric acid/derivative thereof to the ammonium dihydrogen phosphate may be about 99:1 to about 1:99. Within the aforementioned range of weight ratios, the ratio of each component may be adjusted according to the amount of heat released by the battery and/or the corresponding safety factor.

In an embodiment, the weight ratio of the triethyl phosphate, the dispersant, the non-flammable solvent, the barbituric acid/derivative thereof, the ammonium dihydrogen phosphate, the N-Dodecyl-N,N-dimethyl-3-ammonio-1-propanesulfonate, the composite material which may be formed by bonding the polyurethane (PU) foaming material and an inorganic material, and the Boehmite may be about 2:0.3:1.5:5:0.5:0.2:0.2:0.3.

In an embodiment, after the cover is covered on the housing with the lithium battery cell placed therein, and after the corresponding electrode of the lithium battery cell is electrically connected to the corresponding electrode contact on the cover or housing, and before the endothermic and fire suppressive material is injected from the injection hole into the housing with the cover covering it, the lithium battery cell may be properly tested by using the corresponding electrode contacts on the cover or housing. The test item may include but is not limited to: external short circuit test, impact test, drop test, overcharge test (e.g., voltage overcharge or current overcharge), forced discharge test, internal short circuit test or overheating test. In this way, if an aforementioned test is not passed, at least an appropriate repair step or a confirmation step may be performed before injecting the endothermic and fire suppressive material. For example, if it could be repaired or confirmed to have applicability, the step of injecting the endothermic and fire suppressive material may be performed. For another example, if it could not be repaired or it is confirmed not applicable, the intermediate product may be scrapped or the corresponding lithium battery cell, housing or cover may be recycled for reuse.

Referring to FIG. 1A, step S50: the injection hole is sealed.

In an embodiment, the injection hole for being injected the endothermic and fire suppressive material may be sealed by filling the injection hole with heat-resistant and fire-resistant glue (e.g., an acrylic glue or an epoxy resin; but not limited) and curing it.

In an embodiment, after the endothermic and fire suppressive material is injected into the housing through the injection hole; and/or, after sealing the injection hole, a fireproof film, a fire-resistant film, or a fire suppressive film may be formed on the outside of the housing and/or the cover by spraying, coating, wetting and/or another suitable method. In an embodiment, the aforementioned fireproof film, the aforementioned fire-resistant film, the aforementioned fire suppressive film may at least partially cover the injection hole.

In an embodiment, the aforementioned endothermic and fire suppressive material may be applied to a lithium battery module, but the endothermic and fire suppressive material may further have other applications.

In an embodiment, since the material of the objection filled into and/or covered the injection hole is different from the material of the housing or the material of the cover, under the same pressure, before the housing or cover is damaged, the objection filled into and/or covered the injection hole may be relatively easy to peel and/or detach from the injection hole. Therefore, in an application of the lithium battery module, the injection hole may be referred as a corresponding pressure relief hole (e.g., for reducing the gas pressure in the accommodating space formed by the housing and the cover).

After the above process, the production of the lithium battery module of an embodiment could be substantially completed.

[Safety Test of Lithium Battery Module]

A lithium battery module of an embodiment of the disclosure could be subjected to various tests according to requirements to confirm that it meets a general safety standard. The test item may include but is not limited to: external short circuit test, impact test, vibration test, altitude mode test, forced discharge test, drop test (e.g., a 1.2-meter drop test), temperature test, overcharge test or impact test. A test standard may include but is not limited to: UL 2054, IEC 61960 and/or GB/T 18287.

The test may be performed for the entire lithium battery module. For example, a corresponding electrical test may be to conduct an electrical test on the entire lithium battery module through the positive contact and the negative contact.

[Schematic Structure or Appearance of a Lithium Battery Module]

FIG. 1C is a partial perspective view of a lithium battery module according to the first embodiment of the disclosure.

Referring to FIG. 1C, a lithium battery module 100 includes a housing 110, a cover 120, at least one lithium battery cell 131, and an endothermic and fire suppressive material 140. The cover 120 is disposed on the housing 110. The housing 110 and the cover 120 constitute an accommodating space S. The lithium battery cell 131 is disposed in the accommodating space S. The endothermic and fire suppressive material 140 is filled in the accommodating space S.

In the embodiment, the lithium battery module 100 may include a plurality of lithium battery cells 131. In an embodiment, the lithium battery cell 131 may be a pouch type battery cell.

In the embodiment, the positive contact E1 and the negative contact E2 are disposed on the cover 120.

In the embodiment, the injection hole 150 is disposed on the cover 120.

Figure 2:
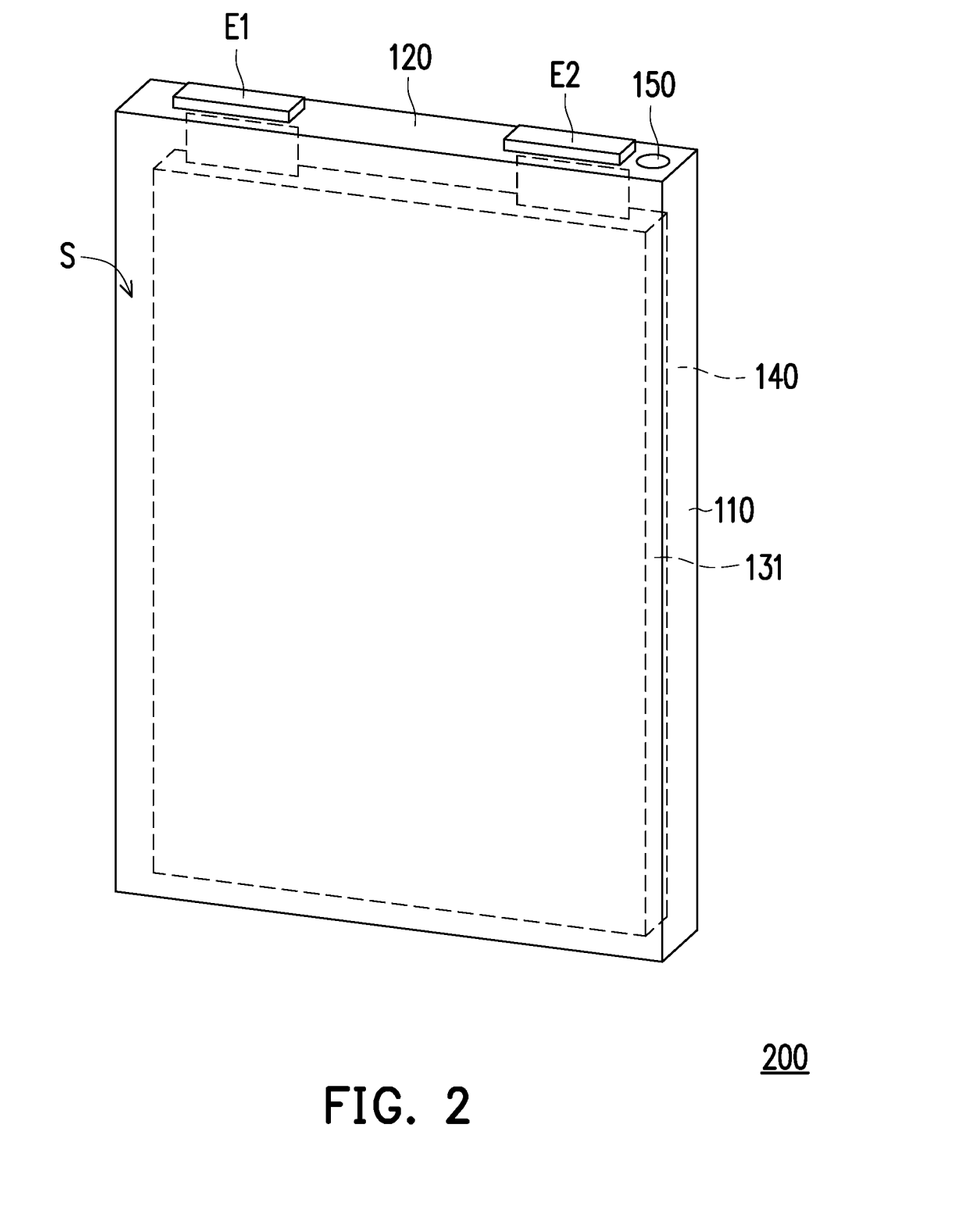
FIG. 2 is a partial perspective view of a lithium battery module according to a second embodiment of the disclosure.

FIG. 2 is a partial perspective view of a lithium battery module according to the second embodiment of the disclosure. The manufacturing method of the lithium battery module 200 of this embodiment is similar to the manufacturing method of the lithium battery module 100 of the previous embodiment, and the same or similar components are denoted by the same or similar symbols, and have similar functions, materials or forms, and descriptions are omitted.

Referring to FIG. 2, a lithium battery module 200 includes a housing 110, a cover 120, at least one lithium battery cell 131, and an endothermic and fire suppressive material 140. The cover 120 is disposed on the housing 110. The housing 110 and the cover 120 constitute an accommodating space S. The lithium battery cell 131 is disposed in the accommodating space S. The endothermic and fire suppressive material 140 is filled in the accommodating space S.

In the embodiment, the lithium battery module 200 may include a single lithium battery cell 131.

Figure 3:
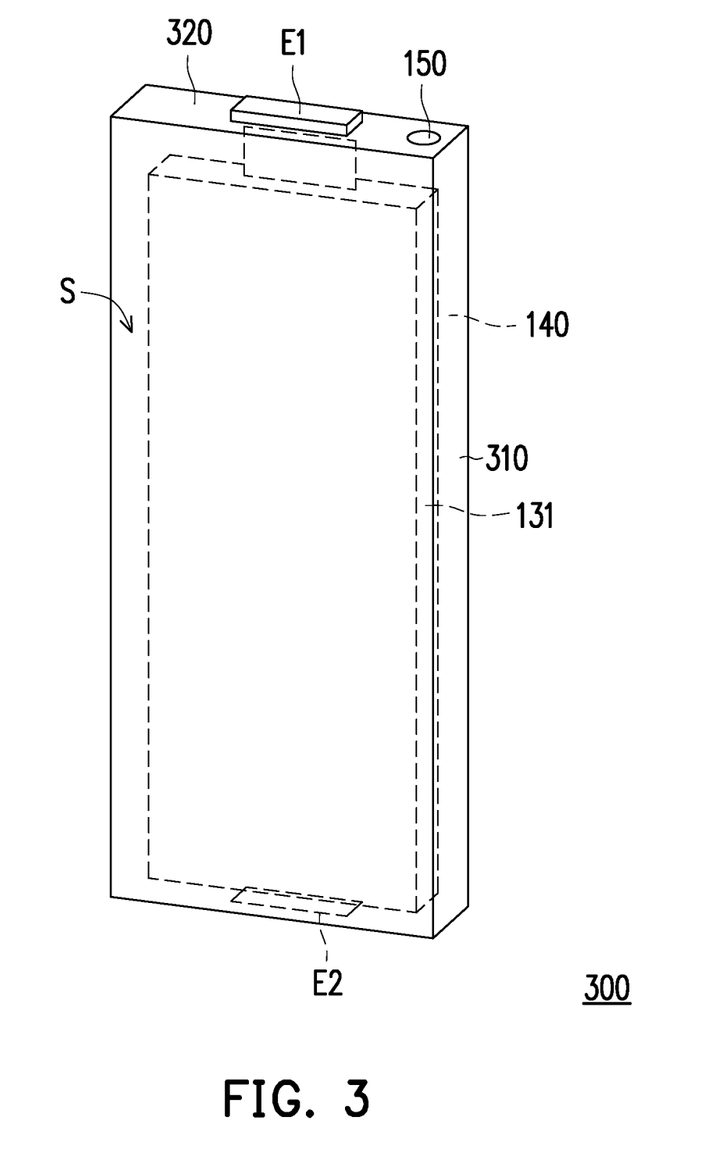
FIG. 3 is a partial perspective view of a lithium battery module according to a third embodiment of the disclosure.

FIG. 3 is a partial perspective view of a lithium battery module according to the third embodiment of the disclosure. The manufacturing method of the lithium battery module 300 of this embodiment is similar to the manufacturing method of the lithium battery module 100 of the previous embodiment, and the same or similar components are denoted by the same or similar symbols, and have similar functions, materials or forms, and descriptions are omitted.

Referring to FIG. 3, a lithium battery module 300 includes a housing 310, a cover 320, at least one lithium battery cell 131, and an endothermic and fire suppressive material 140. The cover 320 is disposed on the housing 310. The housing 310 and the cover 320 constitute an accommodating space S. The lithium battery cell 131 is disposed in the accommodating space S. The endothermic and fire suppressive material 140 is filled in the accommodating space S.

In the embodiment, the lithium battery module 300 may include a single lithium battery cell 131.

In the embodiment, one of the positive contact E1 and the negative contact E2 is disposed on the cover 320, and the other of the positive contact E1 and the negative contact E2 is disposed on the housing 310. For example, the positive contact E1 is disposed on the cover 320, and the negative contact E2 is disposed on the housing 310. In an embodiment not shown, the negative contact E2 could be disposed on the cover 320, and the positive contact E1 could be disposed on the housing 310.

In the embodiment, the injection hole 150 is disposed on the cover 320.

Figure 4:
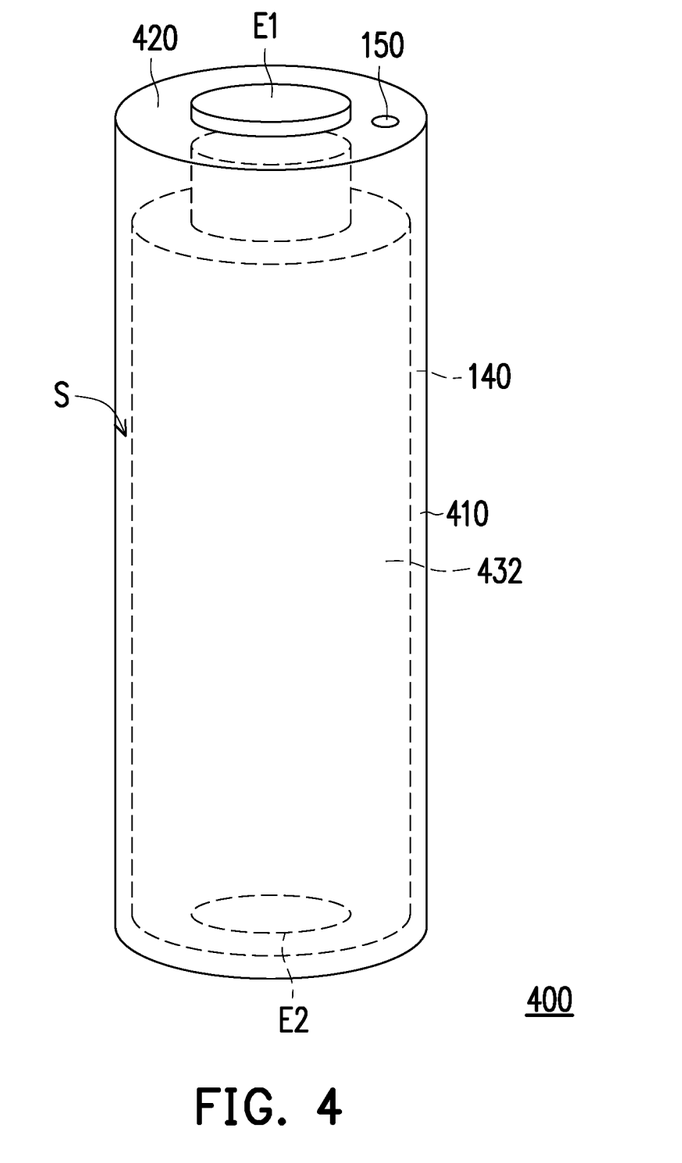
FIG. 4 is a partial perspective view of a lithium battery module according to a fourth embodiment of the disclosure.

FIG. 4 is a partial perspective view of a lithium battery module according to the fourth embodiment of the disclosure. The manufacturing method of the lithium battery module 400 of this embodiment is similar to the manufacturing method of the lithium battery module 100 of the previous embodiment, and the same or similar components are denoted by the same or similar symbols, and have similar functions, materials or forms, and descriptions are omitted.

Referring to FIG. 4, a lithium battery module 400 includes a housing 410, a cover 420, at least one lithium battery cell 432, and an endothermic and fire suppressive material 140. The cover 420 is disposed on the housing 410. The housing 410 and the cover 420 constitute an accommodating space S. The lithium battery cell 432 is disposed in the accommodating space S. The endothermic and fire suppressive material 140 is filled in the accommodating space S.

In the embodiment, the lithium battery module 400 may include a single lithium battery cell 431. In an embodiment, the lithium battery cell 432 may be a cylindrical type battery cell.

In the embodiment, the positive contact E1 and the negative contact E2 are disposed on the cover 420.

In the embodiment, the injection hole 150 is disposed on the cover 420.

Figure 5:
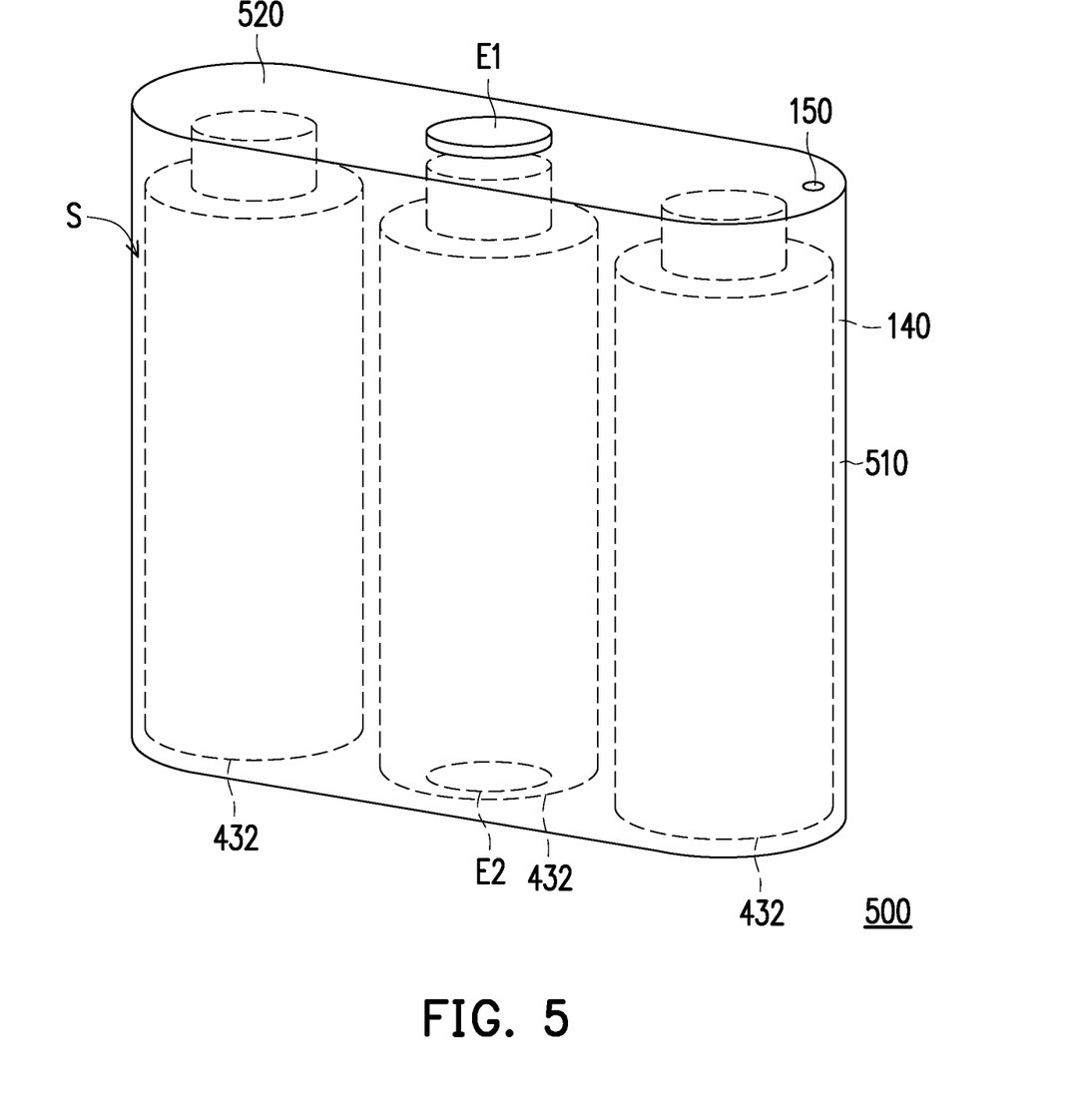
FIG. 5 is a partial perspective view of a lithium battery module according to a fifth embodiment of the disclosure.

FIG. 5 is a partial perspective view of a lithium battery module according to the fifth embodiment of the disclosure. The manufacturing method of the lithium battery module 500 of this embodiment is similar to the manufacturing method of the lithium battery module 100 of the previous embodiment, and the same or similar components are denoted by the same or similar symbols, and have similar functions, materials or forms, and descriptions are omitted.

Referring to FIG. 5, a lithium battery module 500 includes a housing 510, a cover 520, at least one lithium battery cell 432, and an endothermic and fire suppressive material 140. The cover 520 is disposed on the housing 510. The housing 510 and the cover 520 constitute an accommodating space S. The lithium battery cell 432 is disposed in the accommodating space S. The endothermic and fire suppressive material 140 is filled in the accommodating space S.

In the embodiment, the lithium battery module 500 may include a plurality of lithium battery cells 432.

In the embodiment, one of the positive contact E1 and the negative contact E2 is disposed on the cover 520, and the other of the positive contact E1 and the negative contact E2 is disposed on the housing 510. For example, the positive contact E1 is disposed on the cover 520, and the negative contact E2 is disposed on the housing 510. In an embodiment not shown, the negative contact E2 could be disposed on the cover 520, and the positive contact E1 could be disposed on the housing 510.

In the embodiment, the injection hole 150 is disposed on the cover 520.

Figure 6:
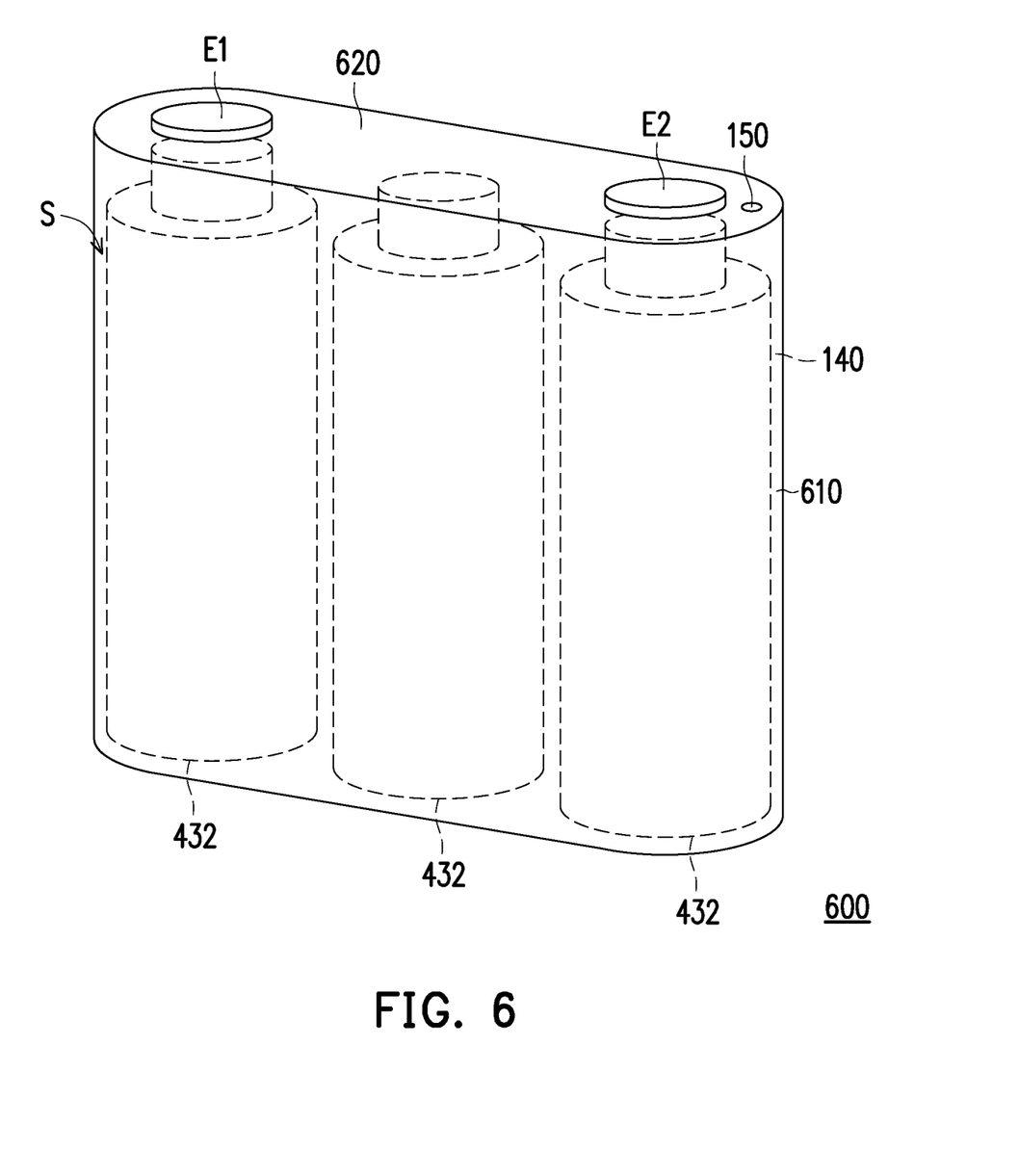
FIG. 6 is a partial perspective view of a lithium battery module according to a sixth embodiment of the disclosure.

FIG. 6 is a partial perspective view of a lithium battery module according to the sixth embodiment of the disclosure. The manufacturing method of the lithium battery module 600 of this embodiment is similar to the manufacturing method of the lithium battery module 100 of the previous embodiment, and the same or similar components are denoted by the same or similar symbols, and have similar functions, materials or forms, and descriptions are omitted.

Referring to FIG. 6, a lithium battery module 600 includes a housing 610, a cover 620, at least one lithium battery cell 432, and an endothermic and fire suppressive material 140. The cover 620 is disposed on the housing 610. The housing 610 and the cover 620 constitute an accommodating space S. The lithium battery cell 432 is disposed in the accommodating space S. The endothermic and fire suppressive material 140 is filled in the accommodating space S.

In the embodiment, the lithium battery module 600 may include a plurality of lithium battery cells 432.

In the embodiment, the positive contact E1 and the negative contact E2 are disposed on the cover 620.

In the embodiment, the injection hole 150 is disposed on the cover 620.

Figure 7:
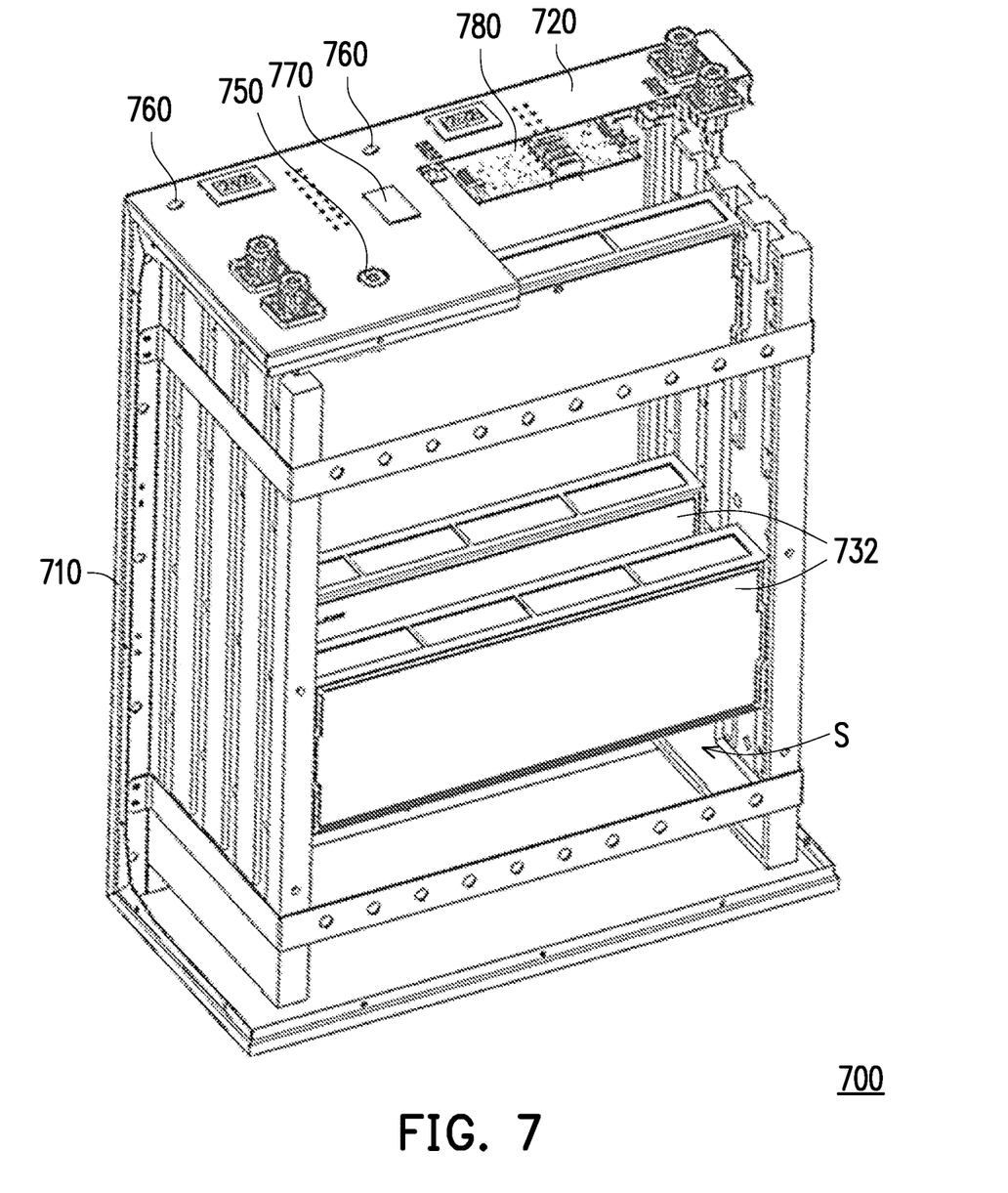
FIG. 7 is a partial perspective view of a lithium battery module according to a seventh embodiment of the disclosure.

FIG. 7 is a partial perspective view of a lithium battery module according to the seventh embodiment of the disclosure. The manufacturing method of the lithium battery module 700 of this embodiment is similar to the manufacturing method of the lithium battery module 100 of the previous embodiment, and the same or similar components are denoted by the same or similar symbols, and have similar functions, materials or forms, and descriptions are omitted.

Referring to FIG. 7, a lithium battery module 700 includes a housing 710, a cover 720, at least one lithium battery cell 732, and an endothermic and fire suppressive material (not directly shown, may be the same or similar to the aforementioned endothermic and fire suppressive material 140). The cover 720 is disposed on the housing 710. The housing 710 and the cover 720 constitute an accommodating space S. The lithium battery cell 732 is disposed in the accommodating space S. The endothermic and fire suppressive material may be filled in the accommodating space S.

In the embodiment, the injection hole 550 is disposed on the cover 720. The endothermic and fire suppressive material may be injected from the injection hole 750 into the housing 710 with the cover 720 covering it.

In the embodiment, the cover 720 may have a pressure relief hole 760. If necessary, the pressure relief hole 760 may reduce the gas pressure in the accommodating space S formed by the housing 710 and the cover 720. In addition, the disclosure does not limit the number or position of a pressure relief hole that is/are the same as or similar to the pressure relief hole 760.

In the embodiment, the cover 720 may have a gas release valve 770. If necessary, the gas release valve 770 may release the gas generated in the accommodating space S formed by the housing 710 and the cover 720 to the outside. In addition, the disclosure does not limit the number or position of a pressure relief hole that is/are the same as or similar to the gas release valve 770.

In an embodiment, the gas release valve 770 may include an explosion-proof valve, a vent valve, a gas release groove or a fin-type pressure relief hole, but the disclosure is not limited thereto. In an embodiment, the profile of the gas release groove may be the same or similar to that of a cone, but the disclosure is not limited thereto. In an embodiment, the fin-type pressure relief hole may have a plurality of fin-type covers on the outside and a corresponding mesh barrier on the inside.

In the embodiment, the lithium battery module 700 may further include an electronic device 780 disposed on the cover 720. The electronic device 780 may include a protection circuit module (PCM) or a battery management system (BMS). In addition, the disclosure does not limit the number or position of an electronic device that is/are the same as or similar to the electronic device 780.

Examples and Comparative Examples

Hereinafter, examples and comparative examples are provided to specifically describe the disclosure, but the disclosure is not limited to the following examples.

In addition, the examples and comparative examples can be tested and recorded in a standard environment according to a standard test method by a third-party non-profit impartial organization (e.g., Industrial Technology Research Institute (ITRI)).

[A Filling Test with/without an Endothermic and Fire Suppressive Material]

Actual test comparisons were carried out with Examples 1, 2 and 3 filled with an endothermic and fire suppressive material and Comparative Example 1 not filled with any endothermic and fire suppressive material.

Comparative Example 11

After taking two commercially available lithium-cobalt battery cell with a capacity of 5 Ah and connecting them in parallel, and then put the parallel-connected battery cells into a housing to simulate a lithium battery module. Additionally, there is no endothermic and fire suppressive material in the housing.

Example 1

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, 21 grams of powdered endothermic and fire suppressive material was filled into the housing. The powdered endothermic and fire suppressive material used in [Example 1] is the barbituric acid/derivative thereof.

Example 2

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, 27 grams of liquid endothermic and fire suppressive material was filled into the housing. The liquid endothermic and fire retardant material used in [Example 2] is triethyl phosphate, water, the barbituric acid/derivative thereof, and ammonium dihydrogen phosphate in a weight ratio of approximately 1:4:4:1.

Example 3

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, 29 grams of emulsified endothermic and fire suppressive material was filled into the housing. The emulsified endothermic and fire suppressive material used in [Example 3] is triethyl phosphate, dispersant, water, the barbituric acid/derivative thereof, and ammonium dihydrogen phosphate in a weight ratio of approximately 2:0.3:1.5:5.5:0.7.

Comparison Between [Comparative Example 1], [Example 1], [Example 2] and [Example 3]

[Comparative Example 1], [Example 1], [Example 2] and [Example 3] were tested by a commonly used acupuncture test.

[Comparative Example 1] caught fire and emitted smoke. The highest temperature measured by the temperature probe exceeded 210° C., and the entire housing and battery cells were burned and damaged.

[Example 1], [Example 2] and [Example 3] have no fire or smoke. The highest temperature measured by the temperature probe did not exceed about 100° C., and the appearance of the entire housing and battery cells did not have obvious burning damage, only the battery cells were slightly bulging.

[Preliminary Test after Overcharging]

[Example 4] (filled with an endothermic and fire suppressive material) and [Comparative Example 4] (without any endothermic and fire suppressive material) are simulated in an actual use condition: overcharge the battery, and then perform an actual test for comparison. One purpose of overcharging the battery first is to confirm that it has a higher electric potential energy.

Comparative Example 4

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, there is no endothermic and fire suppressive material in the housing.

The lithium battery module of [Comparative Example 4] was overcharged; then, the lithium battery module of [Comparative Example 4] was tested by a commonly used acupuncture test.

Example 4

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, a powdered endothermic and fire suppressive material was filled into the housing. The powdered endothermic and fire suppressive material used in [Example 4] is the barbituric acid/derivative thereof and ammonium dihydrogen phosphate.

The lithium battery module of [Example 4] was overcharged; then, the lithium battery module of [Example 4] was tested by a commonly used acupuncture test.

After the needle is pierced into the battery module, the output voltage of the battery module will be significantly reduced due to the short-circuit effect. Moreover, due to the short-circuit effect, heat energy is rapidly generated inside the battery module. The heat energy may be dissipated to the outside, and therefore, the corresponding temperature rise can be measured for both the inside of the battery module (e.g., the lithium battery cells) and the outside of the battery module (e.g., the outer surface of the housing).

Comparison Between [Comparative Example 4] and [Example 4]

The structure of [Comparative Example 4] is similar to the structure of [Example 4], and the difference is: [Comparative Example 4] has no endothermic and fire suppressive material, and [Example 4] has an endothermic and fire suppressive material. Therefore, in order to reduce the variation of position, for the temperature measurement described later, the temperature comparison measurement between [Comparative Example 4] and [Example 4] can be performed at the same or similar corresponding position.

After the needle is pierced into the battery module, the temperature is measured at one or more corresponding positions inside the battery module (e.g., the lithium battery cells). The highest temperature measured in [Comparative Example 4] was about 100° C. or more higher than the highest temperature measured in [Example 4].

After the needle is pierced into the battery module, the temperature is measured at one or more corresponding positions outside of the battery module (e.g., the outer surface of the housing). The highest temperature measured in [Comparative Example 4] was about 80° C. or more higher than the highest temperature measured in [Example 4].

Taking the moment when the needle is pierced into the battery module as the $0^{th}$ second, the time of the highest temperature measured in [Example 4] is the $M^{th}$ second, and the time of the highest temperature measured in [Comparative Example 4] is the $N^{th}$ second, and M and N have the following relationship: M−N≥30 (e.g., M minus N is greater than or equal to 30).

[Detailed Test after Overcharge]

Figure 8:
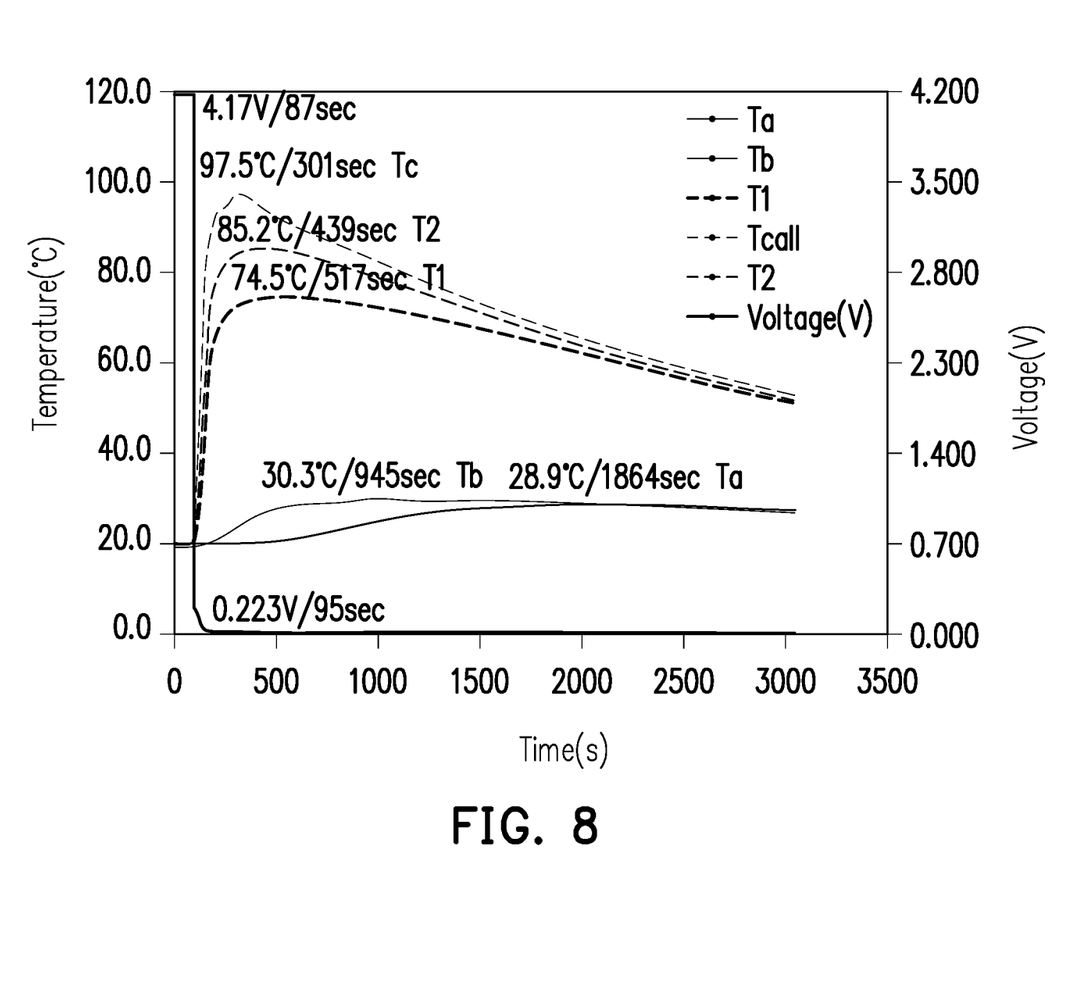
FIG. 8 is a chart of test results of [Example 5] of the disclosure.

[Example 5] (filled with an endothermic and fire suppressive material) and [Comparative Example 5] (without any endothermic and fire suppressive material) are simulated in an actual use condition: overcharge the battery, and then an actual test is performed and the temperature is measured (e.g., the time-temperature curve as shown in FIG. 8) for comparison. One purpose of overcharging the battery first is to confirm that it has a higher electric potential energy.

Comparative Example 5

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, there is no endothermic and fire suppressive material in the housing.

[Comparative Example 5] was tested by a commonly used acupuncture test.

After the needle is pierced into the battery module, heat energy will be rapidly generated inside the battery module due to the short-circuit effect. Moreover, the short-circuited battery module quickly caught fire and emitted smoke. The highest temperature measured somewhere on the outside of the battery module (e.g., the outer surface of the housing) exceeds 350° C. Furthermore, external and internal inspections were performed after the acupuncture test, both the housing and the battery cells have been burned and destroyed obviously.

Example 5

Performing the same or similar method to the aforementioned comparative example 1, after taking two commercially available lithium-cobalt battery cell with a capacity of 5 Ah and connecting them in parallel, and then put the parallel-connected battery cells into a housing to simulate a lithium battery module. Additionally, a powdered endothermic and fire suppressive material was filled into the housing. The powdered endothermic and fire suppressive material used in [Example 5] is the barbituric acid/derivative thereof and ammonium dihydrogen phosphate. The appearance of the lithium battery module could be similar to that shown in FIG. 1B or FIG. 1C. [Example 5] was tested by a commonly used acupuncture test.

Additionally, the output voltage of the lithium battery module, the temperature of the pierced portion approximately at the center of the battery module, the temperature on both sides in the length direction (one side includes the positive and negative contacts) of the battery module, the temperature on both sides in the width direction of the battery module were measured during the acupuncture test. During the acupuncture test, the needle was approximately pierced into the center of the battery module at about the $87^{th}$ second.

The test results are shown in FIG. 8. In FIG. 8, the "Voltage" curve corresponds the output voltage (unit of vertical axis: volt) of the lithium battery module at each time (unit of horizontal axis: second); the "Tc" curve corresponds the temperature (unit of vertical axis: ° C.) of the pierced portion approximately at the center of the battery module at each time (unit of horizontal axis: second); the "T1" curve corresponds the temperature (unit of vertical axis: ° C.) near the positive and negative contacts in the length direction of the battery module at each time (unit of horizontal axis: second); the "T2" curve corresponds the temperature (unit of vertical axis: ° C.) away from the positive and negative contacts in the length direction of the battery module at each time (unit of horizontal axis: second); the "Ta" curve corresponds the temperature (unit of vertical axis: ° C.) on one side of the battery module in the width direction of the battery module at each time (unit of horizontal axis: second); and the "Tb" curve corresponds the temperature (unit of vertical axis: ° C.) at the other side in the width direction of the battery module at each time (unit of horizontal axis: second).

As shown in FIG. 8, after the needle is pierced into the battery module, the output voltage of the battery module will be significantly reduced (from 4.17V to 0.223V) due to the short-circuit effect. Moreover, due to the short-circuit effect, heat energy is rapidly generated inside the battery module. However, with the endothermic and fire suppressive material of an embodiment of the disclosure, it is possible to reduce and/or avoid burning phenomena (e.g., no fire and smoke in appearance) and have an endothermic and/or cooling effect (e.g., the highest temperature on the outside surface of the battery module does not exceed 100° C. at any time).

Furthermore, external and internal inspections were performed after the acupuncture test, both the housing and the battery cells have been burned and destroyed obviously, and only the battery cells were slightly bulging (the swelling rate were about 65%~90%).

In summary, in the manufacturing method of the lithium battery module of the disclosure, it is possible to make the manufacturing method of the lithium battery module relatively simple by directly filling an endothermic and fire suppressive material into an accommodating space where the lithium battery cell(s) is/are placed; and/or the lithium battery cell(s) of a lithium battery module of the disclosure is/are covered by an endothermic and fire suppressive material, so the lithium battery module is relatively safe.

INDUSTRIAL APPLICABILITY

The endothermic and fire suppressive material of the disclosure may be applied to a lithium battery module. The endothermic and fire retardant material of the disclosure may further have other applications. For example, the endothermic and fire suppressive material may be properly applied in conjunction or integration with a circuit board, depending on a reasonable application. The lithium battery module of the disclosure may be used as an electrical energy storage application.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lithium battery module, comprising:
   a housing;
   a cover, disposed on the housing, wherein the housing and the cover constitute an accommodating space;
   at least one lithium battery cell, disposed in the accommodating space; and
   an endothermic and fire suppressive material, filled in the accommodating space and covering the lithium battery cell, wherein the endothermic and fire suppressive material comprises:
   barbituric acid, barbituric acid derivative, or a combination thereof;
   ammonium dihydrogen phosphate;
   triethyl phosphate; and
   a dispersant, comprising an acrylic polymer containing ammonium salt,
   wherein a weight ratio of the barbituric acid, the barbituric acid derivative, or a combination thereof account to the ammonium dihydrogen phosphate is 99:1 to 1:99,
   wherein a weight ratio of the barbituric acid, the barbituric acid derivative, or a combination thereof account to the triethyl phosphate is 99:1 to 1:99, and
   wherein the at least one lithium battery cell includes a solid electrolyte interface (SEI), and the endothermic and fire suppressive material is configured to, during a short-circuit event, a maximum temperature within the lithium battery module is maintained below a minimum temperature of thermal decomposition or thermal degradation of the solid electrolyte interface (SEI) included in the at least one lithium battery cell.

2. The lithium battery module to claim 1, wherein at least one of the housing or the cover has an injection hole.

3. The lithium battery module to claim 2, wherein the injection hole is sealed.

4. The lithium battery module to claim 1, wherein the endothermic and fire suppressive material is an electrically insulating material, at least one of the housing or the cover has a positive contact, at least one of the housing or the cover has a negative contact, a positive electrode of the lithium battery cell is connected to the positive contact, and a negative electrode of the lithium battery cell is connected to the negative contact.

5. The lithium battery module to claim 1, the endothermic and fire suppressive material is in a liquid form, a powder form, an emulsified form, or a colloidal form.

6. The lithium battery module to claim 1, wherein the barbituric acid, the barbituric acid derivative, or a combination thereof account for at least 1 wt % of the endothermic and fire suppressive material.

* * * * *